(12) United States Patent
Paielli

(10) Patent No.: US 11,994,175 B2
(45) Date of Patent: May 28, 2024

(54) SYSTEM AND METHOD FOR CONTROLLING DOG CLUTCH ACTUATOR

(71) Applicant: Dana Automotive Systems Group, LLC, Maumee, OH (US)

(72) Inventor: Perry M. Paielli, Sand Creek, MI (US)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 0 days.

(21) Appl. No.: 18/192,462

(22) Filed: Mar. 29, 2023

(65) Prior Publication Data
US 2024/0026938 A1    Jan. 25, 2024

Related U.S. Application Data

(60) Provisional application No. 63/369,157, filed on Jul. 22, 2022.

(51) Int. Cl.
*F16D 27/118* (2006.01)

(52) U.S. Cl.
CPC .... *F16D 27/118* (2013.01); *F16D 2500/3056* (2013.01)

(58) Field of Classification Search
CPC .......... F16D 27/118; F16D 2500/3056; F16D 2500/7042; F16D 2500/70418; F16D 2500/30404
See application file for complete search history.

(56) References Cited

U.S. PATENT DOCUMENTS

| | | | | |
|---|---|---|---|---|
| 2008/0122436 A1* | 5/2008 | Pinkos | ............... | F16H 48/24 324/207.21 |
| 2017/0198766 A1* | 7/2017 | Onitake | ............... | F16D 48/064 |
| 2017/0267246 A1* | 9/2017 | Hashimoto | ............. | F16D 7/044 |
| 2020/0076346 A1* | 3/2020 | Rennie | ............... | G07F 9/10 |

FOREIGN PATENT DOCUMENTS

DE    102016210459 A1 *  12/2017

OTHER PUBLICATIONS

Screenshot of definition of "rate of change" retrieved from https://www.investopedia.com/terms/r/rateofchange.asp (Year: 2023).*
Screenshot of definition of "rate of decrease" synonymous with "rate of change", retrieved from https://proofwiki.org/wiki/Definition: Rate_of_Change/Decrease (Year: 2023).*

* cited by examiner

*Primary Examiner* — Stacey A Fluhart
(74) *Attorney, Agent, or Firm* — McCoy Russell LLP (57) ABSTRACT

Methods and systems for operating a dog clutch actuator are disclosed. In one example, the voltage that is supplied to a dog clutch actuator is gradually reduced when a dog clutch is returned to a base position via a return spring. The voltage may be reduced at a rate that is based on a temperature of a fluid in which a dog clutch may be submerged.

19 Claims, 8 Drawing Sheets

SYSTEM AND METHOD FOR CONTROLLING DOG CLUTCH ACTUATOR

CROSS REFERENCE TO RELATED APPLICATION

The present application claims priority to U.S. Provisional Application No. 63/369,157, entitled "SYSTEM AND METHOD FOR CONTROLLING DOG CLUTCH ACTUATOR", and filed on Jul. 22, 2022. The entire contents of the above-listed application are hereby incorporated by reference for all purposes.

TECHNICAL FIELD

The present disclosure relates to a system and method for controlling a dog clutch actuator. The dog clutch actuator may be configured as a solenoid that directly adjusts a position of a dog clutch. Alternatively, the dog clutch actuator may control a position of a lever or other mechanism to control dog clutch position.

BACKGROUND AND SUMMARY

A vehicle driveline may include a dog clutch to selectively couple and decouple components of the vehicle driveline. For example, a dog clutch may be configured within a gear box to shift between gears. Alternatively, a dog clutch may be configured as a disconnect clutch to selectively couple and decouple a propulsion source from vehicle wheels. In still other examples, a dog clutch may selectively couple and decouple axles in a vehicle that includes tandem axles. The dog clutch is an efficient way to transfer torque and it may transfer large amounts of torque without slip when it is fully engaged.

A dog clutch may be engaged via a solenoid actuator. The solenoid actuator may directly move the dog clutch or it may move the dog clutch via a lever or other mechanism. The solenoid actuator is electrically powered and it may be configured to move the dog clutch in a single direction or in two directions. For single direction solenoid actuators, the dog clutch may be returned to its base position via a spring. The return spring may provide a significant force to decouple one half of the dog clutch from the other half of the dog clutch. The spring force and the mass of the dog clutch may generate an impingement sound when the dog clutch is commanded to an open position. The sound of impingement between one half of the dog clutch and a backstop may be undesirable. Therefore, it may be desirable to reduce impingement sounds that may be generated via dog clutch components.

The inventor herein has recognized the above-mentioned issues and has developed a method for operating a dog clutch actuator, comprising: applying a voltage to a dog clutch actuator to operate the dog clutch actuator in a first state; and reducing an average value of the voltage to the dog clutch actuator at a predetermined rate to exit from the first state and to enter a second state.

By gradually reducing an average value of a voltage that is supplied to a dog clutch actuator, it may be possible to provide the technical result of reducing impingement forces when operating a dog clutch. Gradually reducing the average value of the voltage gradually reduces magnetic forces within the dog clutch actuator so that the return spring is not unopposed when the operating state of the dog clutch is changed. In one example, the rate that the average voltage is reduced may be based on a temperature of a fluid in which the dog clutch may be at least partially submerged. As such, during cold operating conditions, electric current flow to the dog clutch actuator may be reduced at a higher rate so that the dog clutch may opened or closed sooner during operating conditions where the fluid may reduce impingement of dog clutch components. On the other hand, during warm operating conditions, electric current flow to the dog clutch actuator may be reduced at a lower rate so that the dog clutch may opened or closed slower during operating conditions where the fluid may not reduce impingement of dog clutch as much as may be desired.

The present description may provide several advantages. In particular, the approach may reduce impingement noise between components of a dog clutch. In addition, the approach allows a dog clutch actuator to speed up during cold conditions when faster actuator response may be desired and slow down during warm conditions when likelihood of impingement noise may be greater. Further, the approach may be implemented in alternative ways to improve design flexibility.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

DETAILED DESCRIPTION

Figure 3A:
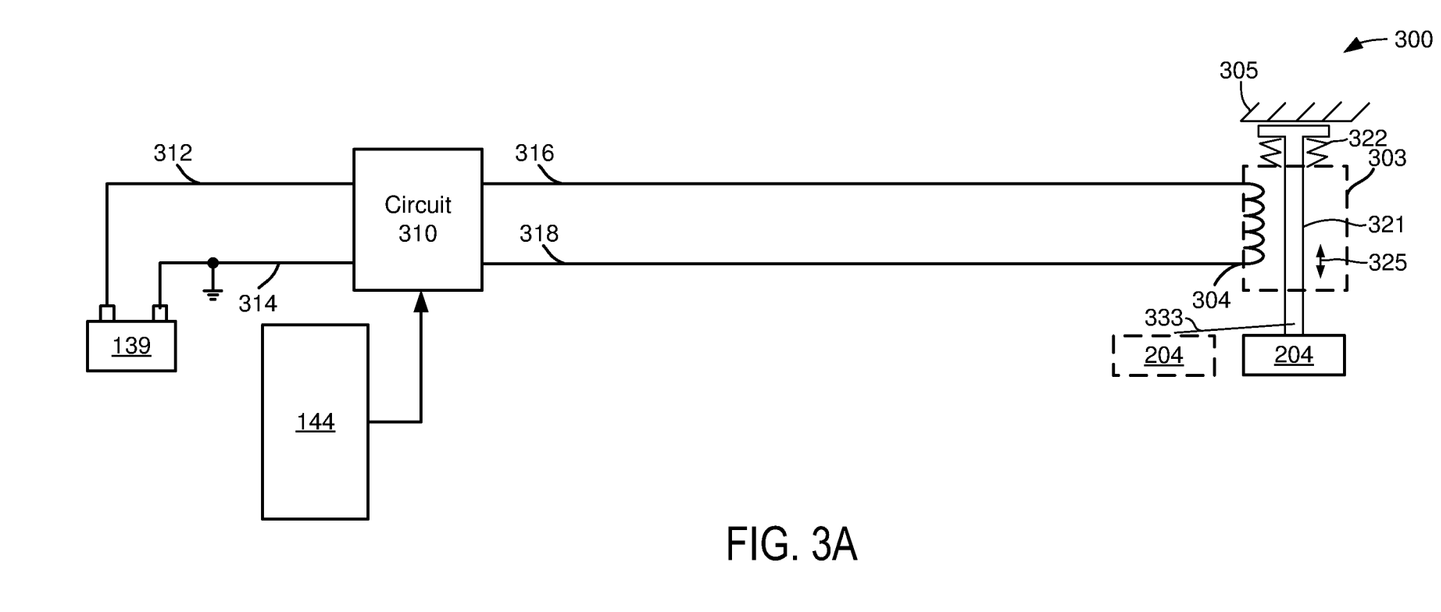
FIG. 3A shows an electrical schematic of an example voltage control circuit for operating a dog clutch actuator.
Figure 3B:
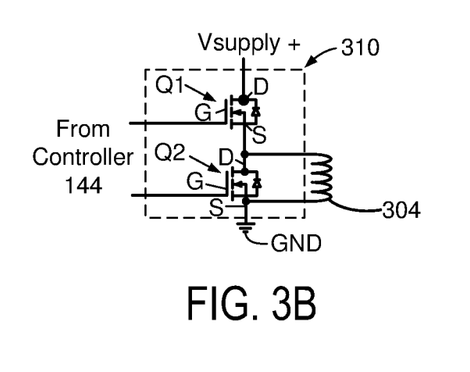
FIG. 3B shows an example switching circuit.
Figure 4:
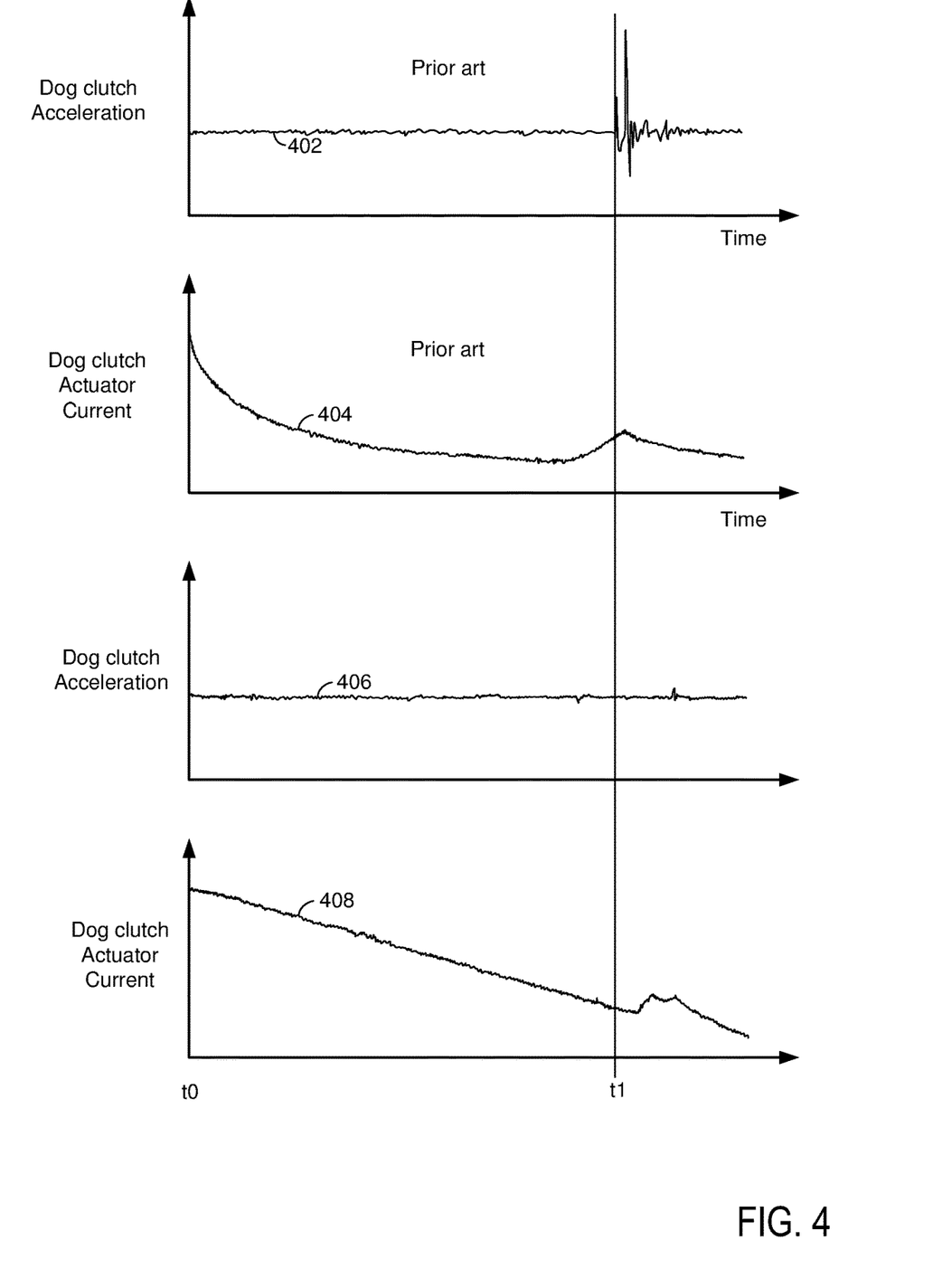
FIG. 4 shows plots of dog clutch actuator operation.
Figure 5:
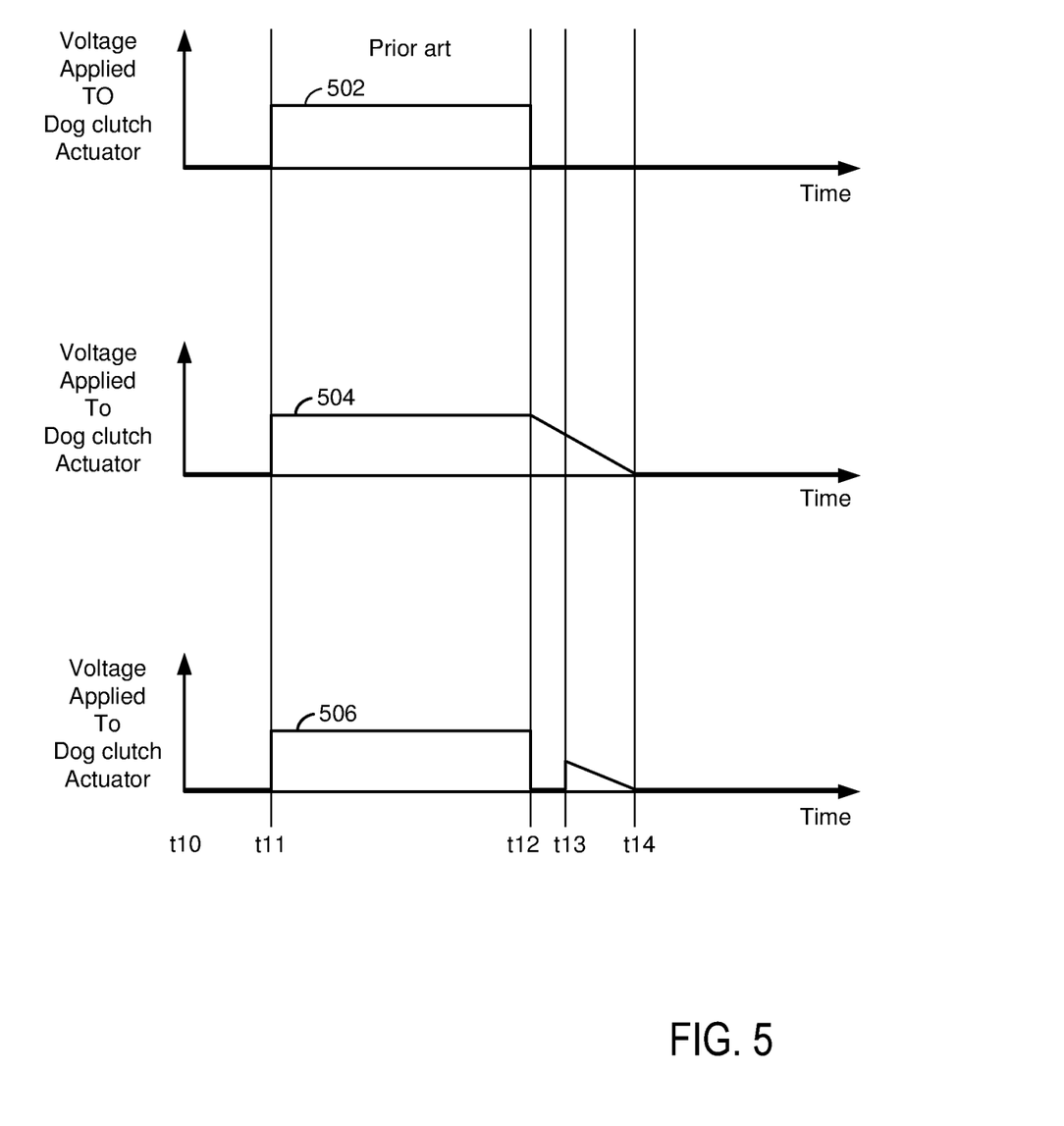
FIG. 5 shows example plots of average voltage values applied to a dog clutch actuator.
Figure 6:
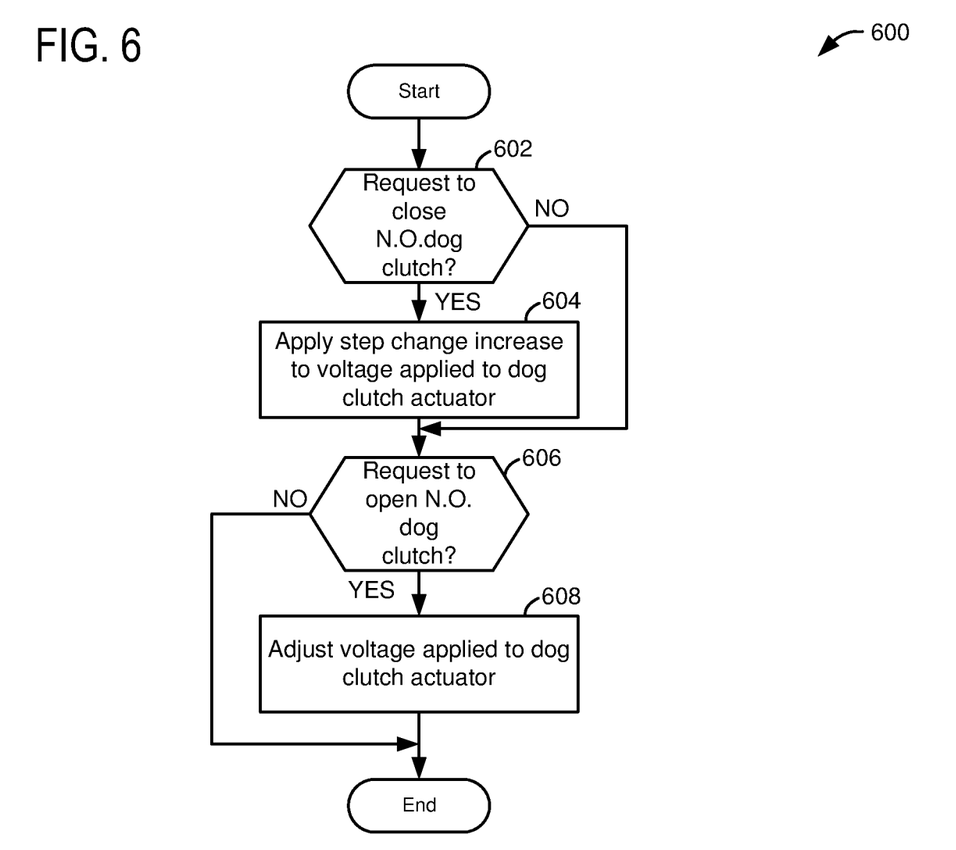
FIG. 6 shows a method for operating a system that includes a dog clutch.
Figure 7:
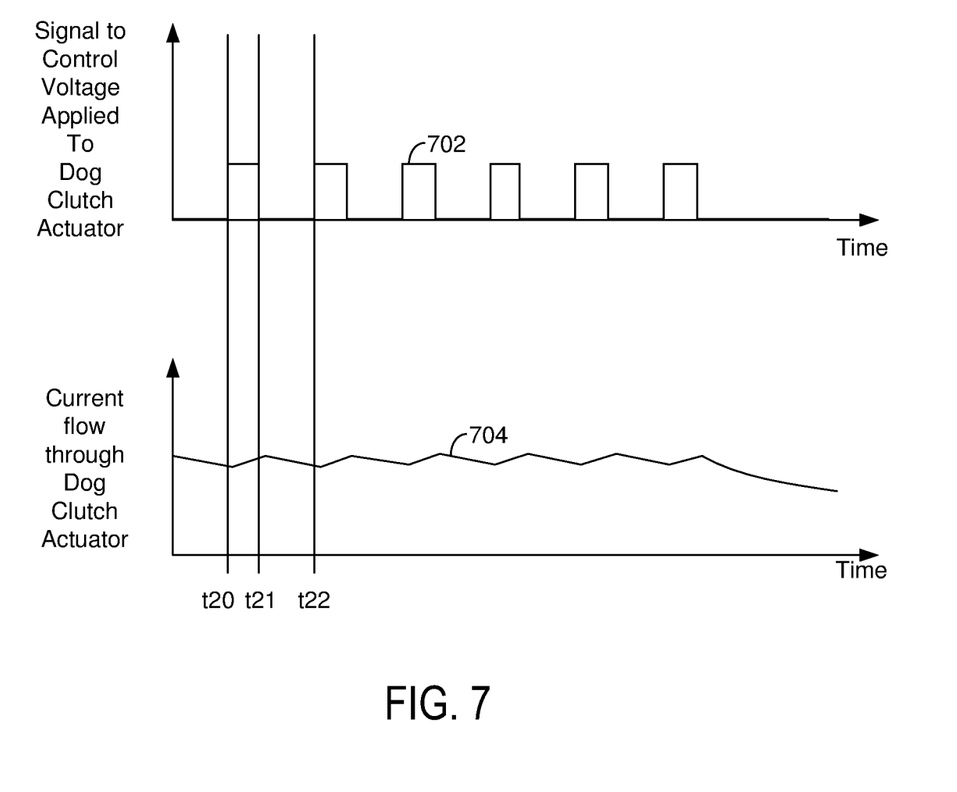
FIG. 7 shows an example signal for controlling a dog clutch actuator.
Figure 8:
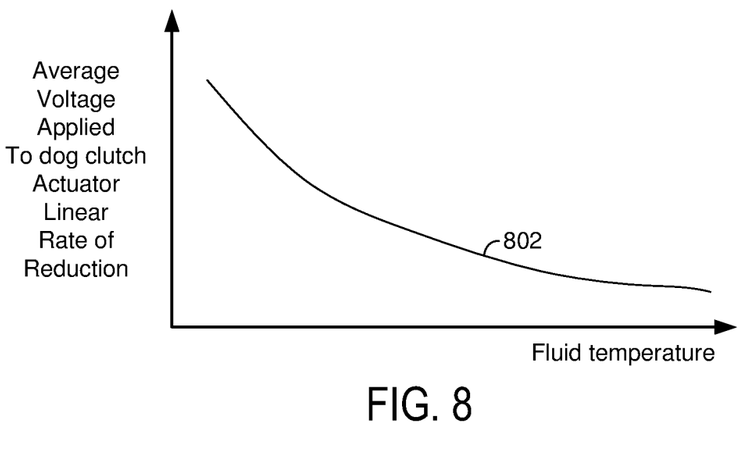
FIGS. 8 and 9 show example functions for controlling a dog clutch actuator.
Figure 9:
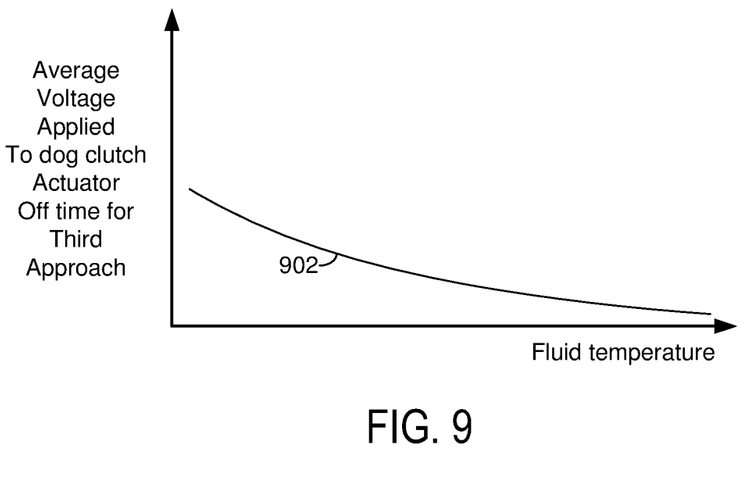

The following description relates to systems and methods for operating a dog clutch actuator. The dog clutch actuator may selectively engage and disengage a dog clutch. The dog clutch may selectively transfer torque in one or more components of a vehicle driveline including but not limited to an axle, gearbox, driveshaft, and differential. The system may reduce impingement velocity of a dog clutch system component during select conditions to reduce vehicle noise and improve vehicle operation. The dog clutch actuator may be included in a vehicle of the type shown in FIG. 1 or in an alternative vehicle configuration. The dog clutch may be of the type shown in FIG. 2. The dog clutch actuator may be included in a circuit as shown in FIG. 3A, which may include a switching circuit as shown in FIG. 3B. The dog clutch actuator may be operated as shown in FIG. 4. FIG. 5 shows example average voltage profiles for operating a dog clutch actuator. FIG. 6 shows a method for operating a dog clutch actuator. FIG. 7 shows an example signal for controlling a dog clutch actuator. Finally, FIGS. 8 and 9 show example functions for operating a dog clutch actuator.

Figure 1:
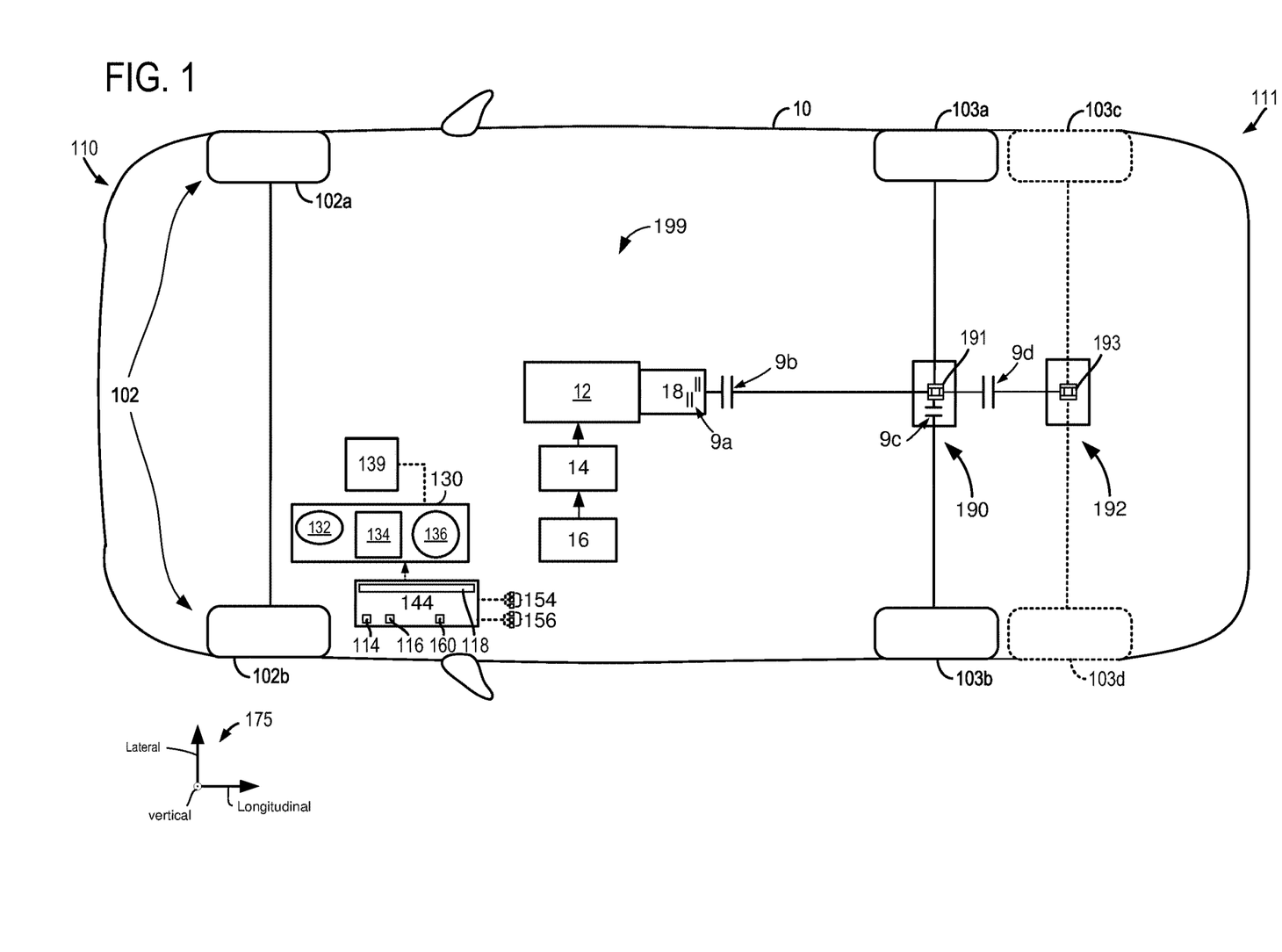
FIG. 1 is a schematic diagram of an example driveline assembly.

FIG. 1 illustrates an example vehicle driveline 199 included in vehicle 10. Vehicle 10 includes a front side 110 and a rear side 111. Vehicle 10 includes front wheels 102a and 102b. Vehicle also includes rear wheels 103a and 103b. In some examples, vehicle may also include optional rear wheels 103c and 103d. Vehicle 10 includes a propulsion source 12 that may selectively provide propulsive effort to first rear axle 190 and second rear axle 192. In other examples, the propulsion source may provide propulsive effort to front wheels 102. Propulsion source 12 may be an electric machine (e.g., a motor/generator) or an internal combustion engine. Propulsion source is shown mechanically coupled to gearbox 18. Gearbox 18 may include one or more dog clutches 9a for engaging and disengaging one or more gears. In some examples, driveline 199 may include a dog clutch 9b that serves as a driveline disconnect clutch. Dog clutch 9b may be selectively opened to decouple propulsion source 12 from first rear axle 190 and second rear axle 192. Dog clutch 9b may be selectively closed to couple propulsion source 12 to first rear axle 190 and second rear axle 192. Power from propulsion source 12 may be routed to first rear axle 190. First rear axle 190 may include a differential gear set 191 and a dog clutch 9c to selectively couple gears within differential gear set 191. Power from propulsion source 12 may also be routed to second rear axle 192 via dog clutch 9d. Second rear axle 192 also includes a differential gear set 193.

In vehicle configurations where propulsion source 12 is an electric machine, electric energy storage device 16 (e.g., a traction battery or capacitor) may provide electric power to and receive electric power from propulsion source 12. Inverter 14 may convert direct current (DC) from electric energy storage device 16 to alternating current (AC). The AC may be supplied from inverter 14 to propulsion source 12. Alternatively, inverter 14 may convert AC from propulsion source 12 to DC that is supplied to electric energy storage device 16.

Controller 144 may communicate with dashboard 130, propulsion source 12, and dog clutch actuators (not shown). Controller 144 includes read-only memory (ROM or non-transitory memory) 114, random access memory (RAM) 116, a digital processor or central processing unit (CPU) 160, and inputs and outputs (I/O) 118 (e.g., digital inputs including counters, timers, and discrete inputs, digital outputs, analog inputs, and analog outputs). Controller 144 may receive signals from sensors 154 and provide control signal outputs to actuators 156. Sensors 154 may include but are not limited to fluid temperature sensors configured to sense temperatures of fluids (e.g., oil) at the location of each dog clutch, an ambient temperature sensor, wheel speeds, and driveline component rotational speeds. Actuators 156 may include but are not limited to dog clutch actuators (not shown), dog clutch voltage control circuits, and inverter 14.

Vehicle 10 may also include a dashboard 130 that an operator of the vehicle may interact with. Dashboard 130 may include an interactive weather data display and notification system 134 that may communicate weather forecast data to controller 144. Dashboard 130 may further include a display system 132 configured to display information to the vehicle operator. Display system 132 may comprise, as a non-limiting example, a touchscreen, or human machine interface (HMI), display which enables the vehicle operator to view graphical information as well as input commands. In some examples, display system 132 may be connected wirelessly to the internet (not shown) via controller 144. As such, in some examples, the vehicle operator may communicate via display system 132 with an internet site or software application (app) and controller 144. Dashboard 130 and devices included therein may be supplied with electrical power via battery 139. Battery 139 may also supply power to controller 144 and a starter motor (not shown) for propulsion source 12.

Dashboard 130 may further include an operator interface 136 via which the vehicle operator may adjust the operating status of the vehicle. Specifically, the operator interface 136 may be configured to initiate and/or terminate operation of the vehicle driveline (e.g., propulsion source 12) based on an operator input. Various examples of the operator interface 136 may include interfaces that require a physical apparatus, such as an active key, that may be inserted into the operator interface 136 to activate the propulsion source 12 and to turn on the vehicle 10, or may be removed to shut down the propulsion source 12 and to turn off the vehicle. Other examples may include a passive key that is communicatively coupled to the operator interface 136. The passive key may be configured as an electronic key fob or a smart key that does not have to be inserted or removed from the interface 136 to operate the propulsion source 12. Still other examples may additionally or optionally use a start/stop button that is manually pressed by the operator to start or shut down the propulsion source 12. Spatial orientation of vehicle 10 is indicated via axes 175.

Figure 2:
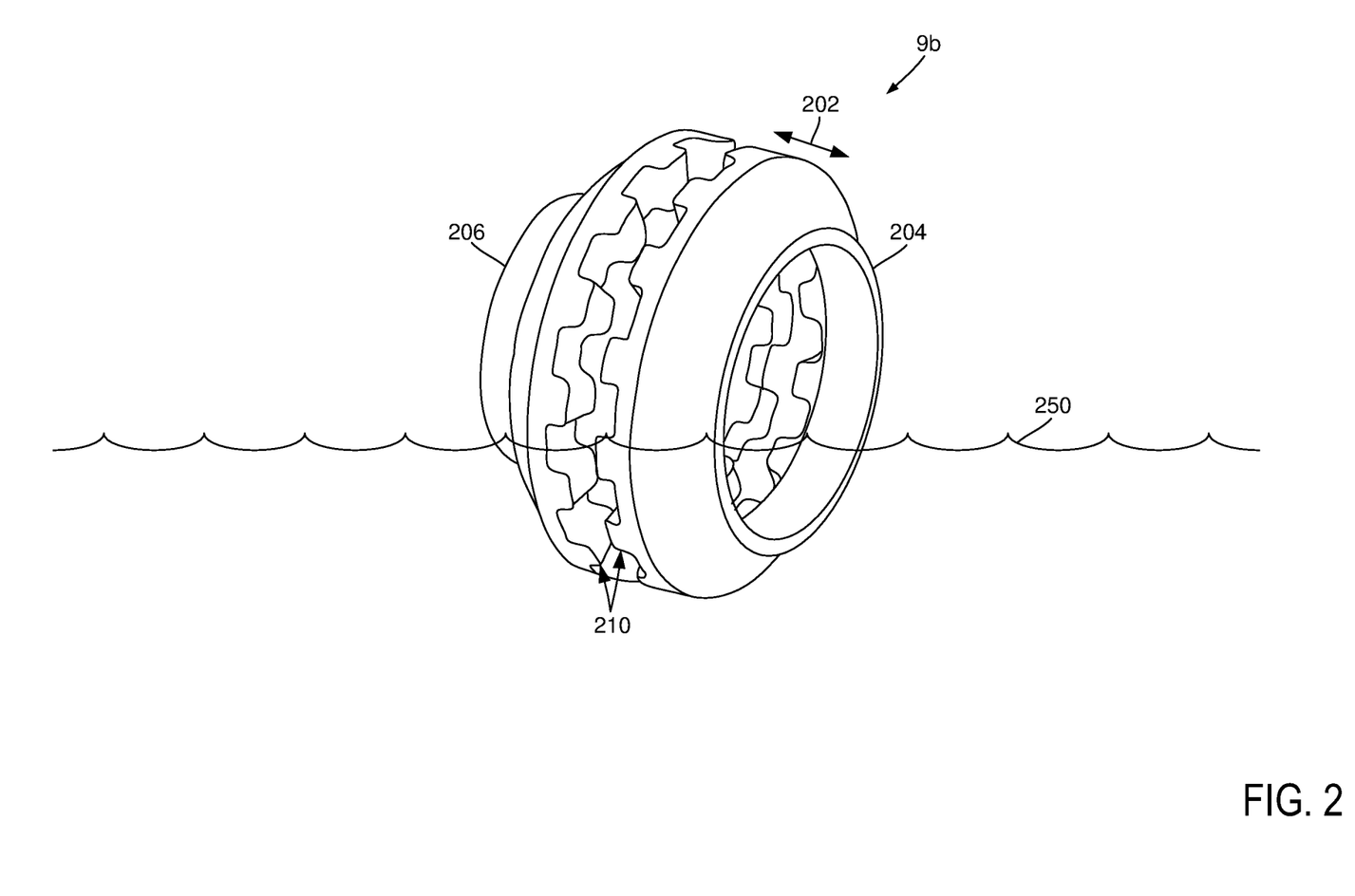
FIG. 2 shows a schematic diagram of an example dog clutch.

Turning now to FIG. 2, a schematic view of an example dog clutch 9b is shown. The other dog clutches mentioned herein may be configured similar to example dog clutch 9b. Dog clutch 9b includes a first half 206, or input side, and a second half 204, or an output side. The output side or the input side may selectively engage the opposing side via being moved as indicated by arrow 202. One dog clutch half may be adjusted via a dog clutch actuator as shown in FIG. 3. Each dog clutch half includes teeth 210 and the teeth may be in contact when dog clutch 9b is closed so as to allow torque to be transferred from first half 206 to second half 204. Dog clutch 9b is shown at least partially submerged in a fluid 250 (e.g., oil or transmission fluid). Fluid 250 may cool and lubricate dog clutch 9b.

Referring now to FIG. 3A, an example voltage control circuit 300 for supplying power to a dog clutch actuator is shown. Voltage control circuit 300 includes battery 139 and a switching circuit 310. Alternatively, a variable linear power supply may replace switching circuit 310. Switching circuit 310 may be configured as a half bridge circuit as shown on FIG. 3B, a full bridge, or an alternative configuration. Switching circuit 310 supplies a voltage to coil 304 of dog clutch actuator 303 according to signals provided via controller 144. Conductors 312, 314, 316, and 318 transfer battery power to coil 304. Dog clutch actuator 303 is configured as a solenoid actuator and it includes a plunger 321 that may move as indicated by arrow 325 when a voltage is applied to coil 304. Plunger 321 is constructed of a ferrous metal and it responds to a magnetic field that is generated when electric current flows through coil 304.

Plunger 321 may assume a base position when a voltage is not applied to coil 304. In the base position, plunger 321 is in contact with backstop 305. Return spring 322 applies a force to plunger 321 to urge plunger 321 to contact backstop 305. In one example, plunger 321 directly adjusts a position of second half 204 of a dog clutch. In other examples, plunger 321 may operate a lever or shift fork 333 to adjust a position of second half 204.

A dog clutch may be configured as being normally open or normally closed by adjusting the position of return spring 322. In this example, the dog clutch is normally open. Return spring may be positioned between backstop 305 and plunger 321 to configure the dog clutch normally closed. For a normally open dog clutch to close, a voltage is applied to dog clutch actuator 303. For a normally closed dog clutch to open, a voltage is applied to dog clutch actuator 303. Return spring 322 may return plunger 321 to its base position when a voltage is removed from coil 304 for a sufficiently long time. Plunger 321 may impingement backstop 305 or a housing of dog clutch actuator to generate an undesirable noise when plunger 321 returns to its base position. The voltage control circuit 300 may be operated as described herein to eliminate or reduce impingement noise that is generated by dog clutch actuator 303. It should be appreciated that voltage control circuit 300 is only one circuit of several circuits that may be configured to adjust a voltage that is applied to a dog clutch as described herein.

Referring now to FIG. 3B, an example switching circuit 310 is shown. In this example, switching circuit 310 is comprised of two transistors Q1 and Q2 in a half bridge configuration. Transistors Q1 and Q2 are shown as field effect transistors, but other types of transistors are suitable for providing similar functionality. The drains of Q1 and Q2 are indicated by D. The gates of Q1 and Q2 are indicated as G. The sources of Q1 and Q2 are indicated as S. The drain of Q1 is coupled to Vsupply+(e.g., positive terminal of battery 139) and the source of Q1 is coupled to the drain of Q2. The source of Q2 is directly coupled to ground (GND) (e.g., the − terminal of battery 139). The bases of Q1 and Q2 are directly coupled to controller 144. Coil 304 is coupled to the drain and source of Q2.

Switching circuit 310 may control the average voltage that is applied to coil 304. In particular, Q1 may be closed and Q2 may be open to supply voltage to coil 304. Current flows through coil 304 when a voltage is applied to coil 304. Energy that is stored in coil 304 may be discharged by opening Q1 and closing Q2. This causes a magnetic field that is generated by coil 304 to collapse, thereby reducing force that is applied by the magnetic field to the plunger 321 and allowing plunger 321 to return to its base position.

Signals that are supplied by controller 144 to the bases of Q1 and Q2 may modulate conduction via Q1 and Q2 and adjust the average voltage that is applied to coil 304. The average voltage that is applied to coil 304 may be determined via the following equation:

$$V_{coil} = V_{supply} \frac{PW}{Period}$$

where $V_{coil}$ is the average voltage that is applied to coil 304, PW is a pulse width of the signals that are provided via controller 144 to the gates of Q1 and Q2, Period is the period of the signals that are provided to the gates of Q1 and Q2.

Thus, the system of FIGS. 1-3B provides for an actuator system, comprising: a dog clutch; a dog clutch actuator; a circuit configured to supply a voltage to the dog clutch actuator; and a controller including executable instructions stored in non-transitory memory that cause the controller to adjust an average value of the voltage to decrease at a first rate, increase, and decrease at a second rate when adjusting the dog clutch actuator from a first state to a second state. The actuator system includes where the first rate is faster than the second rate. The actuator system further comprises additional executable instructions that cause the controller to adjust the voltage to substantially zero (e.g., ground or within 200 millivolts of ground) after the voltage is decreased at the first rate and before the voltage is increased. The actuator system includes where the voltage is adjusted to substantially zero for an amount of time that is based on a temperature of a fluid. The actuator system further comprises additional executable instructions that cause the controller to adjust the second rate based on a temperature. The actuator system includes where the temperature is a temperature of a fluid in which the dog clutch is at least partially submerged. The actuator system includes where the second rate is decreased in response to the temperature increasing.

The system of FIGS. 1-3B also provides for an actuator system, comprising: a dog clutch; a dog clutch actuator; a circuit configured to supply a voltage to the dog clutch actuator; and a controller including executable instructions stored in non-transitory memory that cause the controller to adjust an average value of the voltage to decrease at a first predetermined rate in response to a first set of operating conditions, and adjust the average value of the voltage to decrease at a second predetermined rate in response to a second set of operating conditions. The actuator system includes where the average value of the voltage is adjusted via adjusting a pulse width of a signal. The actuator system includes where the first set of operating conditions include a temperature of a fluid being less than a first temperature. The actuator system includes where the second set of operating conditions include the temperature of the fluid being greater than a second temperature. The actuator system includes where the average value of the voltage is decreased to adjust the dog clutch actuator from a first state to a second state.

Turning now to FIG. 4, plots of dog clutch actuator operation are shown. The first two plots from the top of FIG. 4 show operation of a dog clutch actuator according to a prior art method. The third and fourth plots from the top of FIG. 4 show operation of a dog clutch actuator according to the method of FIG. 6.

The first plot from the top of FIG. 4 is a plot of dog clutch acceleration versus time according to when the dog clutch actuator is operated by the prior art approach. The vertical axis represents dog clutch actuator acceleration and the amount of acceleration increases in the direction of the vertical axis arrow. The horizontal axis represents time and time increases from the left side of the figure to the right side of the figure. Dog clutch actuator acceleration may be used as a surrogate for noise generated by impingement between components of the dog clutch actuator and surrounding system components. The greater the acceleration, the greater the impingement noise.

The second plot from the top of FIG. 4 is a plot of dog clutch actuator current versus time according to when the dog clutch actuator is operated by the prior art approach. The vertical axis represents dog clutch actuator current and the amount of dog clutch actuator current increases in the direction of the vertical axis arrow. The horizontal axis represents time and time increases from the left side of the figure to the right side of the figure.

The third plot from the top of FIG. 4 is a plot of dog clutch acceleration versus time according to when the dog clutch actuator is operated by the method of FIG. 6. The vertical axis represents dog clutch actuator acceleration and the amount of acceleration increases in the direction of the vertical axis arrow. The horizontal axis represents time and time increases from the left side of the figure to the right side of the figure. The acceleration scale of the third plot is equivalent to the acceleration scale of the first plot.

The fourth plot from the top of FIG. 4 is a plot of dog clutch actuator current versus time according to when the dog clutch actuator is operated by the method of FIG. 6. The vertical axis represents dog clutch actuator current and the amount of dog clutch actuator current increases in the direction of the vertical axis arrow. The horizontal axis represents time and time increases from the left side of the figure to the right side of the figure. The current scale of fourth plot is equivalent to the current scale of the second plot.

Before time t0, the dog clutch actuator for the prior art method and the method described herein is activated with electric current flowing through the dog clutch actuator. The acceleration level for the prior art method and the method described herein has little high frequency energy that is indicative of impingement noise.

At time t1, the dog clutch actuator for the prior art method is commanded off and electric current flow of the dog clutch actuator for the prior art begins to fall at an exponential rate. The dog clutch actuator for the dog clutch actuator control described herein is supplied with a reduced average voltage (not shown), which causes the electric current flowing through the dog clutch actuator to be reduced linearly. The rate of average voltage reduction and the corresponding linear rate of reduction in current flow according to the method described herein may be a function of a temperature of oil that the dog clutch is exposed to and/or submerged in.

At time t2, the dog clutch actuator for the prior art method is release to a position where an impingement occurs in the dog clutch system. In one example, the dog clutch actuator plunger may impingement a stop to generate the impingement noise. The electric current flow according to the prior art method has declined to a lower level. The dog clutch actuator when operated according to the present method described herein does not cause a large impingement noise at time t1, but it reaches a fully open position a little later than the dog clutch actuator according to the prior art method. The dog clutch actuator according to the present method is supplied with a voltage that causes a linear rate of reduction of electric current in the dog clutch actuator from time t0 to time t1. This more gradual rate in electric current flow allows the dog clutch actuator to provide a greater force to oppose the spring force that is applied to the dog clutch actuator plunger. Consequently, the plunger of the dog clutch actuator that is operated according to the present method moves at a slower rate so as to reduce impingement noise.

Referring now to FIG. 5, plots of voltage control for a dog clutch actuator are shown. The first plot from the top of FIG. 5 shows voltage applied to a dog clutch actuator according to a prior art method. The second and third plots from the top of FIG. 5 show voltage control for a dog clutch actuator according to the method of FIG. 6.

The first plot from the top of FIG. 5 is a plot of a voltage that is applied to a dog clutch actuator versus time according to a prior art approach. The vertical axis represents voltage applied to a dog clutch actuator and the voltage level or amount increases in the direction of the vertical axis arrow. The horizontal axis represents time and time increases from the left side of the figure to the right side of the figure.

The second plot from the top of FIG. 5 is a plot of a first average voltage profile that is applied to a dog clutch actuator according to the method described herein. The vertical axis represents averaged voltage applied to a dog clutch actuator and the averaged voltage level or amount increases in the direction of the vertical axis arrow. The horizontal axis represents time and time increases from the left side of the figure to the right side of the figure.

The third plot from the top of FIG. 4 is a plot of a second average voltage profile that is applied to a dog clutch actuator according to the method described herein. The vertical axis represents averaged voltage applied to a dog clutch actuator and the averaged voltage level or amount increases in the direction of the vertical axis arrow. The horizontal axis represents time and time increases from the left side of the figure to the right side of the figure.

At time t10, no voltage is applied to the three dog clutch actuators. At this time, the actuators are in their base state and their dog clutches may be engaged or disengaged depending on if the dog clutch is configured normally open or normally closed.

At time t11, a voltage (e.g., battery voltage) is applied to each of the three dog clutch actuators and the dog clutch actuators change state (not shown) (e.g., to a first state of activated) in response to the applied voltage.

At time t12, according to the prior art approach (the first plot from the top of FIG. 5) the voltage is removed from the dog clutch actuator. This is the type of voltage control profile may yield impingement and electric current profiles that are similar to those that are shown in the first and second plots from the top of FIG. 4. When voltage is withdrawn from the dog clutch actuator in a step-wise fashion as shown, the dog clutch actuator plunger may be returned quickly to its base position, which may result in impingement noise.

The voltage is not withdrawn from the dog clutch actuator at time t12 according to the voltage control approach described herein and shown in the second plot from the top of FIG. 5. Rather, the average voltage is reduced linearly following a path of a straight line from battery voltage to zero volts. The average voltage may be reduced at a predetermined rate so that the electric current flow through the dog clutch actuator is reduced in a similar way. The voltage reduction approach that is shown in the second plot from the top of FIG. 5 yields impingement and electric current profiles that are similar to those that are shown in the third and fourth plots from the top of FIG. 4. Thus, by reducing the average voltage that is applied to a dog clutch actuator linearly, velocity of the dog clutch actuator may be reduced to reduce impingement noise. The rate that the average voltage is reduced to follow a linear trajectory may be based on a temperature of a fluid that the dog clutch is exposed to or at least partially submerged in. The fluid has an associated viscosity that may provide more resistance to motion of the dog clutch at lower temperatures and less resistance to motion of the dog clutch at higher temperatures. The resistance to motion that is provided by the fluid at lower temperatures may oppose the return spring opening forces, which may reduce the velocity of the dog clutch plunger. Lower plunger velocities may allow current to be removed from the dog clutch actuator at a quicker rate via reducing voltage applied to the dog clutch linearly and a faster rate to allow the dog clutch to open quicker even while noise from impingement is mitigated. Conversely, the resistance to motion that is provided by the fluid at higher temperatures may provide less force to oppose the return spring, which may allow the velocity of the dog clutch plunger to increase if voltage is removed from the dog clutch actuator at a fast rate. Higher plunger velocities may necessitate a slower rate of average voltage reduction that is applied to the dog clutch actuator to reduce impingement noise. For these reasons, the rate that the average voltage is reduced at the dog clutch actuator may be faster (e.g., 5 volts/second decrease) at lower fluid temperatures (e.g., 0 degrees Celsius) and the rate that the average voltage is reduced at the dog clutch actuator may be slower (e.g., 2 volts/second decrease) at higher fluid temperatures (e.g., 30 degrees Celsius). By adjusting the average voltage ramping rate in this way, it may be possible to reduce actuator noise and preserve quick actuator operation.

Initially, similar to the prior art approach, voltage that is applied to the dog clutch actuator according to the second average voltage profile (the third plot from the top of FIG. 5) is removed in a step-wise fashion. This may allow the dog clutch to be withdrawn sooner than the approach shown in the second plot from the top of FIG. 5, but the voltage is subsequently increased in a step-wise fashion at time t13. Step-wise increases or decreases in voltage may be performed in the time of one execution cycle of a voltage control algorithm. For example, a step increase may be performed by applying battery voltage to the dog clutch actuator in a first execution cycle of an algorithm (e.g., method 600) and zero voltage may be applied to the dog clutch actuator during an execution cycle that immediately follows the first execution cycle 20 milliseconds later. The step-wise increase in voltage that is applied to the dog clutch actuator may be a function of a temperature of oil that the dog clutch is exposed to or at least partially submerged in because the voltage is increased to slow the dog clutch plunger via increasing the magnetic field strength that is generated by the dog clutch actuator coil. When fluid temperatures are higher, the average voltage may be increased to a higher level (e.g., ½ battery voltage). When fluid temperatures are lower, the average voltage may be increased to a lower level (e.g., ⅓ battery voltage). Following time t13, the average voltage that is applied to the dog clutch actuator according to the third approach is reduced linearly at a predetermined rate. The predetermined rate may be reduced based on a temperature of a fluid for reasons as previously described. The rate of voltage reduction at time t12 is faster than the rate of voltage reduction at time t13 for the approach of the third plot. The voltage that is applied to the dog clutch actuator for all three approaches is zero at time t14. The dog clutch actuator for the second and third approaches enters a second state at time t14 (e.g., deactivated).

The average voltage control approaches according to the second and third approaches (e.g., second and third plots from the top of FIG. 5) offer the advantage of impingement noise reduction. The third approach offers an advantage of quickly withdrawing the dog clutch while still reducing impingement noise. Because these three approaches offer different advantages during different operating conditions, it may be desirable to apply one approach during one condition and another approach during different operating conditions. For example, at very low fluid temperatures (e.g., less than 0 degrees Celsius) the first approach from the top of FIG. 5 may be applied. At middle temperatures (e.g., above 0 and below 20 degrees Celsius) the third approach may be applied. At higher temperatures (e.g., above 20 degrees Celsius) the second approach may be applied.

Referring now to FIG. 6, an example method for operating a dog clutch and dog clutch actuator is shown. The method described herein may be provided via the system shown in FIGS. 1-3 including controller 144. The method of FIG. 6 may be at least partially implemented as executable instructions stored in memory of one or more controllers in the system of FIGS. 1-3. Further, the method of FIG. 6 may include actions taken in the physical world by one or more controllers to transform an operating state of the system of FIGS. 1-3. Additionally, the method of FIG. 6 may provide the operating sequence shown in FIG. 5.

At 602, method 600 judges whether or not there is a request to close a normally open (N.O.) dog clutch. Alternatively, method 600 may judge whether or not there is a request to open a normally closed dog clutch. The requests to open or close the dog clutch may based on vehicle operating conditions such as but not limited to vehicle speed, engagement of four wheel drive, state of battery charge, driver torque demand, etc. If method 600 judges that there is a request to close a normally open dog clutch or open a normally closed dog clutch, the answer is yes and method 600 proceeds to 604. Otherwise, the answer is no and method 600 proceeds to 606.

At 604, method 600 applies a step change (increase) in a voltage that is applied to a dog clutch actuator via sending a signal to a switching circuit. For half bridge switching circuits as shown in FIG. 3B, method 600 may send a first signal to a first transistor and a second signal to a second transistor. The second signal may be a mirror image of the first signal (e.g., first signal is high while second signal is low and first signal is high when second signal is low). The step change in voltage activates the dog clutch actuator causing the dog clutch to move from its first state to a second state. An example, of such a step change is shown in FIG. 5 at time tn. Method 600 proceeds to 606.

At 606, method 600 judges whether or not there is a request to open a normally open dog clutch. Alternatively, method 600 may judge whether or not there is a request to close a normally closed dog clutch. The requests to open or close the dog clutch may again be based on vehicle operating conditions such as but not limited to vehicle speed, engagement of four wheel drive, state of battery charge, driver torque demand, etc. If method 600 judges that there is a request to open a normally open dog clutch or close a normally closed dog clutch, the answer is yes and method 600 proceeds to 608. Otherwise, the answer is no and method 600 proceeds to exit.

At 608, method 600 adjusts an average voltage that is applied to a dog clutch actuator. The average voltage that is applied to the dog clutch actuator may be adjusted in one or the three ways shown in FIG. 5. The average voltage may be decreased in a step-wise fashion as shown in the first plot from the top of FIG. 5, gradually reduced in a ramp like fashion as shown in the second plot from the top of FIG. 5, or decreased in a step-wise fashion, increased, and decreased gradually as shown in the third plot from the top of FIG. 5. Method 600 may select the voltage adjustment approach according to a temperature of a fluid (e.g., a fluid that the dog clutch is exposed to or at least partially submerged in) as previously mentioned. Method 600 adjusts the averaged voltage via sending one or more signals to a switching circuit. The signals may be pulse width modulated as shown in FIG. 7 to decrease the average voltage that is applied to the dog clutch actuator. Alternatively, if the dog clutch is supplied a voltage from a linear voltage source, the voltage output of the linear voltage source may be adjusted as shown in FIG. 5. Method 600 proceeds to exit.

In this way, a voltage that is applied to a dog clutch actuator and its associated current may be adjusted to follow a linear trajectory so as to reduce a return velocity of the dog clutch actuator plunger. The reduced velocity may reduce impingement noise.

Referring now to FIG. 7, an example of a pulse width modulated signal that may be sent to a switching circuit to control an average voltage that is applied to a coil of a dog clutch actuator is shown. Times of interest in the sequence are indicated at where the vertical lines are shown at times t20-t22.

The first plot from the top of FIG. 7 is a plot of a signal to control voltage that is applied to the dog clutch actuator coil. The signal may have a lower level of zero or ground and a higher level that may be near battery voltage. The vertical axis represents the signal to control voltage level that is applied to the coil of the dog clutch actuator and the voltage increases in the direction of the vertical axis arrow. The horizontal axis represents time and time increases from the left side of the plot to the right side of the plot. Trace 702 represents the signal to control voltage that is applied to the dog clutch actuator coil.

The second plot from the top of FIG. 7 is a plot of electric current that flows through the dog clutch actuator coil as a result of the voltage that is applied to the dog clutch actuator coil. The vertical axis represents the current that flow through the coil of the dog clutch actuator and the current increases in the direction of the vertical axis arrow. The horizontal axis represents time and time increases from the left side of the plot to the right side of the plot. Trace 704 represents the current that flows through the dog clutch actuator coil.

The signal to control voltage that is applied to the dog clutch actuator may be input to a switching circuit (e.g., FIG. 3B). The signal may have a period indicated by the time between time t20 and time t22, which corresponds to a time when the voltage that is applied to the dog clutch actuator coil transitions from a lower level to a higher level. The signal may have a pulse width as indicated by the time between time t20 and time t21. The average voltage and the amount of current that flows through the dog clutch actuator may be a function of a frequency of the signal and a period of the signal. By increasing the period, the average voltage that is applied to the dog clutch actuator coil may be increased. By decreasing the period, the average voltage that is applied to the dog clutch actuator may be decreased.

Referring now to FIG. 8, a prophetic plot of a relationship between an average voltage rate of reduction that is applied to a dog clutch actuator coil and a fluid temperature (e.g., oil or transmission fluid) is shown. The vertical axis represents the average voltage rate of reduction that is applied to the dog clutch actuator and the rate of reduction increases in the direction of the vertical axis arrow. The horizontal axis represents fluid temperature and fluid temperature increases from the left side of the plot to the right side of the plot. Trace 802 represents the relationship between an average voltage rate of reduction that is applied to a dog clutch actuator coil and a fluid temperature. The relationship represented by trace 302 may be empirically determined via adjusting a voltage ramp rate at different fluid temperature and determining which ramp rate withdraws the dog clutch in a shortest amount of time without exceeding a tolerable noise level.

It may be observed that the average rate of voltage reduction that is applied to the dog clutch actuator coil may be higher at lower fluid temperatures since the fluid has higher viscosity at lower temperatures. The average rate of reduction may be applied to adjust the amount of time it takes for the dog clutch actuator to transition from a fully closed state to a fully open state, or vice-versa. Thus, the average rate of reduction may be adjusted to control an amount of time that it take to ramp the average voltage to zero as shown between times t12 and t14 in the second plot from the top of FIG. 5. Additionally, the relationship 802 may be adjusted if the fluid has lower viscosity at lower temperatures.

Referring now to FIG. 9, a prophetic plot of a relationship between an average voltage applied to a dog clutch actuator coil off time and a fluid temperature (e.g., oil or transmission fluid) is shown. The vertical axis represents the average voltage applied to a dog clutch actuator coil off time (e.g., the amount of time between time t12 and time 13 shown in the third plot from the top of FIG. 5) and the average voltage applied to a dog clutch actuator coil off time increases in the direction of the vertical axis arrow. The horizontal axis represents fluid temperature and fluid temperature increases from the left side of the plot to the right side of the plot. Trace 902 represents the relationship between the average voltage applied to a dog clutch actuator coil off time and the fluid temperature.

It may be observed that the average voltage applied to a dog clutch actuator coil off time decreases as fluid temperature increases since the fluid has higher viscosity at lower temperatures. The average off time may be applied to adjust the amount of time it takes for the dog clutch actuator to transition from a fully closed state to a fully open state, or vice-versa. Thus, the average off time may be adjusted to control the rate that the dog clutch actuator coil is withdrawn.

Thus, the method of FIG. 6 provides for a method for operating a dog clutch actuator, comprising: applying a voltage to the dog clutch actuator to operate the dog clutch actuator in a first state; and reducing an average value of the voltage to the dog clutch actuator at a predetermined rate to exit from the first state and to enter a second state. The method includes where the first state is a state where the dog clutch actuator holds open a dog clutch and where the second state is a state where the dog clutch actuator holds closed the dog clutch. The method includes where the first state is a state where the dog clutch actuator holds closed a dog clutch and where the second state is a state where the dog clutch actuator holds open the dog clutch. The method includes where the average value is reduced at a rate that is based on a desired amount of time to move the dog clutch actuator from a fully closed position to a fully open position. The method includes where the average value is reduced at a rate that is based on a desired amount of time to move the dog clutch actuator from a fully open position to a fully closed position. The method includes where the average value is reduced at a rate that is based on a temperature of a fluid in which a dog clutch is at least partially submerged. The method includes where the average value is reduced at a first rate when the temperature is a first temperature, and where the average value is reduced at a second rate when the temperature is a second temperature, the first temperature lower than the second temperature, the first rate faster than the second rate. The method includes where the average value of the voltage is reduced, then increased, then reduced a second time to exit from the first state and to enter the second state.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electric machines and transmissions. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a dog clutch actuator, comprising:
applying a voltage to the dog clutch actuator to operate the dog clutch actuator in a first state; and
reducing an average value of the voltage to the dog clutch actuator at a predetermined rate to exit from the first state and to enter a second state, where the average value is reduced at a rate that is based on a temperature of a fluid in which a dog clutch is at least partially submerged.

2. The method of claim 1, where the first state is where the dog clutch actuator holds open a dog clutch and where the second state is where the dog clutch actuator holds closed the dog clutch.

3. The method of claim 1, where the first state is a state where the dog clutch actuator holds closed a dog clutch and where the second state is where the dog clutch actuator holds open the dog clutch.

4. The method of claim 1, where the average value is reduced at a rate that is based on a desired amount of time to move the dog clutch actuator from a fully closed position to a fully open position.

5. The method of claim 1, where the average value is reduced at a rate that is based on a desired amount of time to move the dog clutch actuator from a fully open position to a fully closed position.

6. The method of claim 1, where the average value is reduced at a first rate when the temperature is a first temperature, and where the average value is reduced at a second rate when the temperature is a second temperature, the first temperature lower than the second temperature, the first rate faster than the second rate.

7. The method of claim 1, where the average value of the voltage is reduced, then increased, then reduced a second time to exit from the first state and to enter the second state.

8. An actuator system, comprising:
a dog clutch;
a dog clutch actuator;
a circuit configured to supply a voltage to the dog clutch actuator; and
a controller including executable instructions stored in non-transitory memory that cause the controller to adjust an average value of the voltage to decrease at a first rate, increase, and decrease at a second rate when adjusting the dog clutch actuator from a first state to a second state.

9. The actuator system of claim 8, where the first rate is faster than the second rate.

10. The actuator system of claim 9, further comprising additional executable instructions that cause the controller to adjust the voltage to substantially zero after the voltage is decreased at the first rate and before the voltage is increased.

11. The actuator system of claim 10, where the voltage is adjusted to substantially zero for an amount of time that is based on a temperature of a fluid.

12. The actuator system of claim 8, further comprising additional executable instructions that cause the controller to adjust the second rate based on a temperature.

13. The actuator system of claim 12, where the temperature is a fluid temperature of a fluid in which the dog clutch is at least partially submerged.

14. The actuator system of claim 13, where the second rate is decreased in response to the temperature increasing.

15. An actuator system, comprising:
a dog clutch;
a dog clutch actuator;
a circuit configured to supply a voltage to the dog clutch actuator; and
a controller including executable instructions stored in non-transitory memory that cause the controller to adjust an average value of the voltage to decrease at a first predetermined rate in response to a first set of operating conditions, and adjust the average value of the voltage to decrease at a second predetermined rate in response to a second set of operating conditions.

16. The actuator system of claim 15, where the average value of the voltage is adjusted via adjusting a pulse width of a signal.

17. The actuator system of claim 15, where the first set of operating conditions include a temperature of a fluid being less than a first temperature.

18. The actuator system of claim 17, where the second set of operating conditions include the temperature of the fluid being greater than a second temperature.

19. The actuator system of claim 15, where the average value of the voltage is decreased to adjust the dog clutch actuator from a first state to a second state.

* * * * *